(12) United States Patent
Ren et al.

(10) Patent No.: US 8,219,571 B2
(45) Date of Patent: Jul. 10, 2012

(54) OBJECT VERIFICATION APPARATUS AND METHOD

(75) Inventors: Haibing Ren, Yongin-si (KR);
Seok-cheol Kee, Yongin-si (KR); Haitao Wang, Yongin-si (KR); Jiali Zhao, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 323 days.

(21) Appl. No.: 11/708,558

(22) Filed: Feb. 21, 2007

(65) Prior Publication Data

US 2007/0203904 A1 Aug. 30, 2007

Related U.S. Application Data

(60) Provisional application No. 60/774,645, filed on Feb. 21, 2006.

(30) Foreign Application Priority Data

Jun. 1, 2006 (KR) ................. 10-2006-0049151

(51) Int. Cl.
*G06F 17/30* (2006.01)
(52) U.S. Cl. ...................... 707/758; 382/115
(58) Field of Classification Search ........... 707/E17.004, 707/E17.027
See application file for complete search history.

(56) References Cited

U.S. PATENT DOCUMENTS

| | | | | |
|---|---|---|---|---|
| 5,566,191 A | * | 10/1996 | Ohnishi et al. | 714/794 |
| 6,651,057 B1 | * | 11/2003 | Jin et al. | 707/5 |
| 6,816,605 B2 | * | 11/2004 | Rowe et al. | 382/115 |
| 6,850,252 B1 | * | 2/2005 | Hoffberg | 715/716 |
| 7,298,873 B2 | * | 11/2007 | Miller et al. | 382/116 |
| 2002/0159506 A1 | * | 10/2002 | Alamouti et al. | 375/147 |
| 2005/0226467 A1 | * | 10/2005 | Hatano et al. | 382/115 |
| 2006/0018516 A1 | * | 1/2006 | Masoud et al. | 382/115 |
| 2006/0171571 A1 | * | 8/2006 | Chan et al. | 382/115 |
| 2006/0204121 A1 | * | 9/2006 | Bryll | 382/255 |
| 2007/0174019 A1 | * | 7/2007 | Vailaya et al. | 702/179 |

OTHER PUBLICATIONS

Multimodal Biometric Authentication Methods: A COTS Approach, Proc. MMUA 2003, Workshop on Multimodal User Authentication, pp. 99-106, Santa Barbara, CA, Dec. 11-12, 2003.*
Face recognition based on fitting a 3D morphable model, V. Blanz, T. Vetter, IEE vol. 25 Issue 9 Sep. 2003 pp. 1063-1074.*
Jain et al. Score Normalization in Multimodal Biometric Systems, published in Pattern Recognition, vol. 38, Issue 12, Dec. 2005.*
Kittler et al. Physics-Based Decorrelation of image Data for Decision Level Fusion in Face Verification, lecture Notes in Computer Science vol. 3077/2004, Sep. 21, 2004.*

* cited by examiner

*Primary Examiner* — Neveen Abel Jalil
*Assistant Examiner* — Kevin L Young
(74) *Attorney, Agent, or Firm* — Staas & Halsey LLP

(57) ABSTRACT

Provided are an object verification apparatus and method. The object verification apparatus includes a matching unit performing a plurality of different matching algorithms on a query image and generating a plurality of scores; a score normalization unit normalizing each of the generated scores to be adaptive to the query image; a weight estimation unit estimating weights of the normalized scores based on the respective matching algorithms applied; and a score fusion unit fusing the normalized scores by respectively applying the weights estimated by the weight estimation unit to the normalized scores.

16 Claims, 10 Drawing Sheets

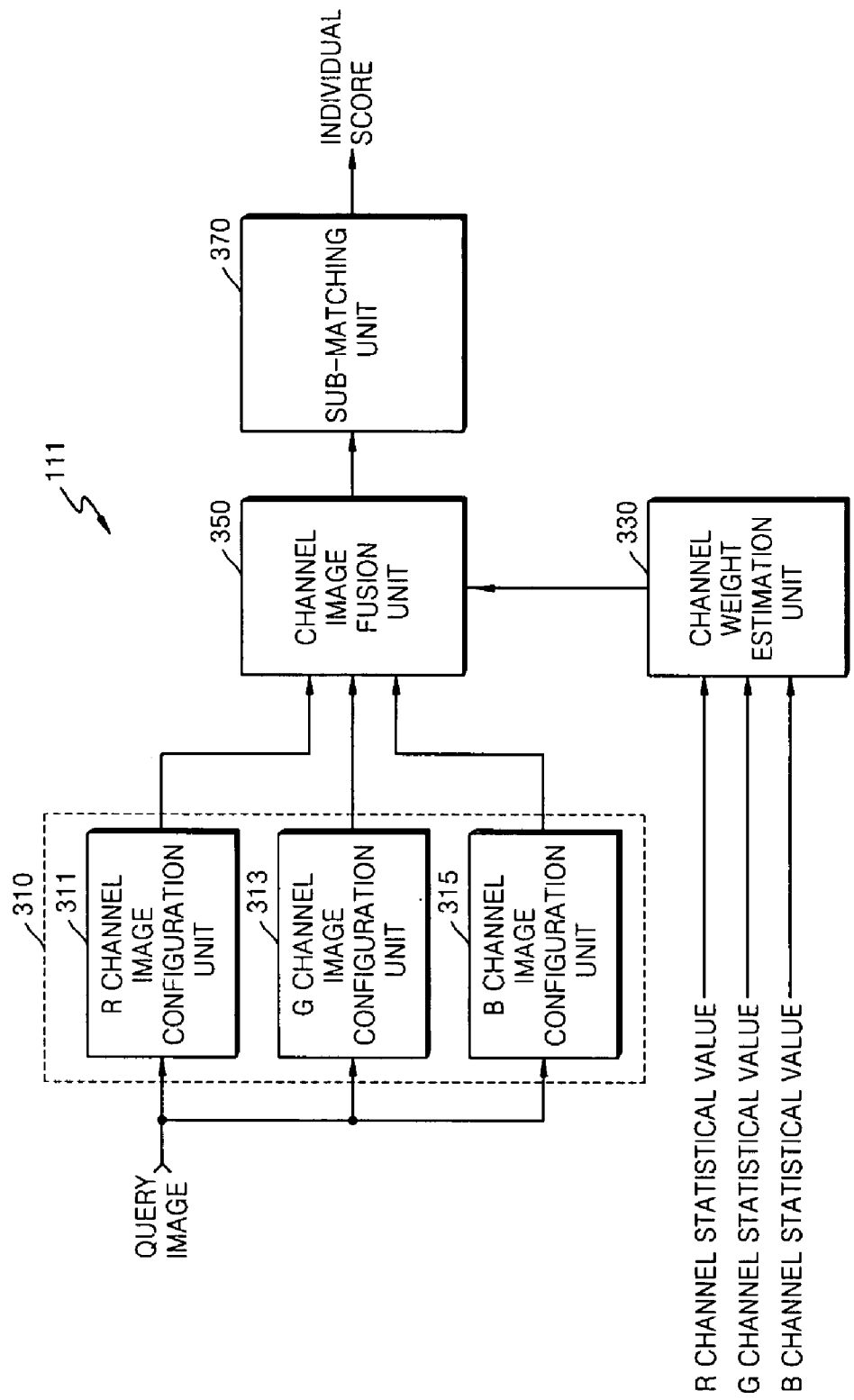

FIG. 4B
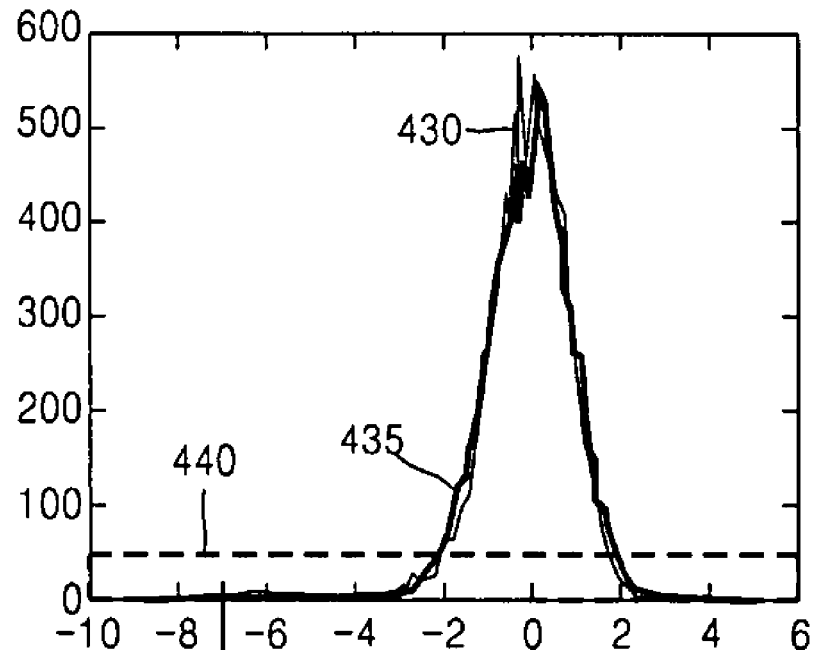
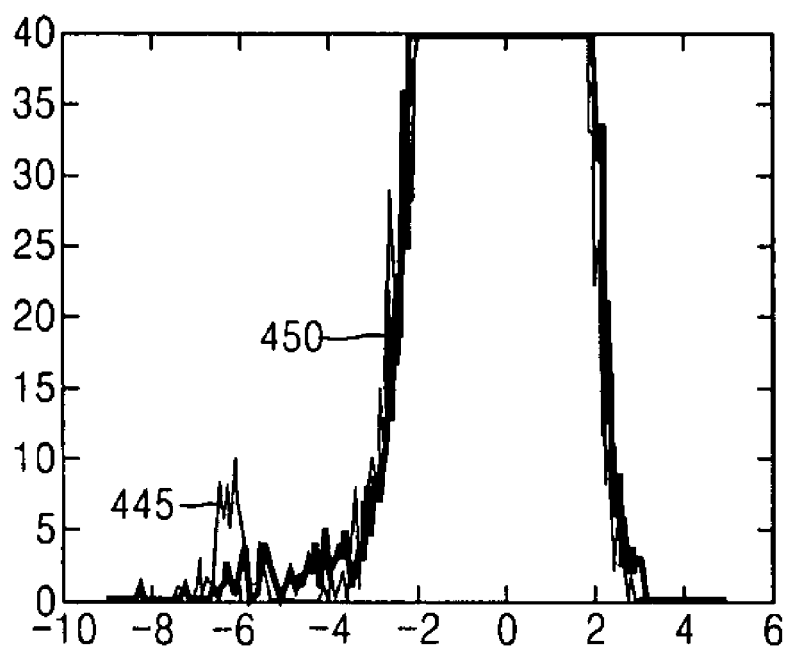

OBJECT VERIFICATION APPARATUS AND METHOD

CROSS-REFERENCE TO RELATED PATENT APPLICATIONS

This application claims the benefit of U.S. Provisional Patent Application No. 60/774,645, filed on Feb. 21, 2006, in the U.S. Patent and Trademark Office, and the benefit of Korean Patent Application No. 10-2006-0049151, filed on Jun. 1, 2006, in the Korean Intellectual Property Office, the disclosures of which are incorporated herein in their entirety by reference.

BACKGROUND OF THE INVENTION

1. Field of the Invention

The present invention relates to object verification, and more particularly, to an object verification apparatus and method in which, when a verification process is performed by applying a plurality of matching algorithms on a query image of an object, each matching algorithm is performed in consideration of color information, adaptive score normalization is performed on the query image, or a weight of a score obtained from each matching algorithm is estimated based on an equal error rate (EER), thereby enhancing the performance of the verification process using a fused score.

2. Description of the Related Art

Objects, for examples, biometric features which have been recently been widely used or intensively studied, include face and its thermogram, fingerprint, hand geometry, hand vein pattern, iris characteristics, retina pattern, signature and handwriting, and voice. However, all of these biometric features have their positive and negative points, and none is clearly superior in terms of all the generally required qualities, i.e. universality, uniqueness, permanence, collectability, performance, acceptability, and circumvention. That is, each biometric feature may have a vulnerable environment or user.

Most of the promising application fields of biometrics, such as information security, financial services, criminal identification and governmental civil service, require a very low error rate, which is difficult to achieve with verification technology based on a single biometric feature. Accordingly, multimodal biometrics technology is being developed, with the goal of enhancing performance and reliability by combining a number of biometrics methods.

A multimodal biometric system may have various operation scenarios. First, a single biometric feature may be obtained using different types of sensors. For example, optical, ultrasonic, and semiconductor sensors may be used to obtain fingerprints. Second, a plurality of different biometric features may be used. For example, a face and fingerprints can be used for biometric recognition. Third, a plurality of feature units may be used for a single biometric feature. For example, the irises of both eyes, the images of both hands, and the ten fingerprints of all fingers may be used. Fourth, a single biometric feature may be obtained several times using a single sensor. For example, the fingerprint of one finger may be obtained several times, the voice of the same person may be sampled several times, or the same person may be photographed several times. Fifth, after an input biometric feature signal is represented in various ways, various matching algorithms may be used. For example, various biometric features may be extracted in response to a fingerprint signal, and biometric recognition may be performed using various matching algorithms.

The level of fusion of a system using multiple information sources denotes the level of information processing at which information is actually fused. Information fusion may occur at a number of levels, such as a feature extraction level, a matching score level, or a decision level, within a multimodal biometric system. Therefore, the level at which information is to be fused must be determined. In particular, there are some considerations that need to be made in order to fuse score matrices obtained from a plurality of matching units into a single score matrix. First, the score matrices are not homogeneous. For example, a matching unit may output a dissimilarity measure as distance, and another matching unit may output a similarity measure. Second, the outputs of the matching units may not use the same scale, range or units. Third, the score matrices obtained from the matching units may follow different statistical distributions. For this reason, it is essential to perform score normalization to convert the score matrix of each matching unit to a common format, before the matrices are fused.

However, a conventional score normalization algorithm has the following problems. First, since a score matrix is obtained using a grayscale image instead of a color image, the accuracy of the score matrix is reduced. Second, score normalization is dependent on the score matrix, so a different normalization parameter is used for each score matrix. Therefore, since the same normalization parameter is used for all scores in a score matrix, the increase of the verification rate is limited. Third, fusion weights used to fuse the normalized score matrices may be manually determined in advance. Alternatively, the fusion weights may be determined based on false acceptance rate (FAR)-false rejection rate (FRR), linear discriminant analysis (LDA), or a recognition rate. Therefore, the actual performances of the matching units are not properly reflected in the fusion weights, which reduces the accuracy of the fusion weights.

Multimodal biometric systems are disclosed in U.S. Pat. Nos. 6,651,057 and 6,539,352, and a paper entitled "Score Normalization in Multimodal Biometric Systems," Pattern Recognition, 2005, by Anil Jain, Karthik Nandakumar, and Arun Ross.

SUMMARY OF THE INVENTION

The present invention provides an object verification apparatus and method which can enhance verification performance by normalizing a plurality of scores obtained respectively from a plurality of matching algorithms to be dependent on a query image of an object and fusing the normalized scores in order to verify the query image using the matching algorithms.

The present invention also provides an object verification apparatus and method which can enhance verification performance by estimating weights of a plurality of scores obtained respectively from a plurality of matching algorithms based on respective equal error rates (EERs) and fusing the scores based on the weights in order to verify the query image using the matching algorithms.

The present invention also provides an object verification apparatus and method which can enhance verification performance by performing a plurality of matching algorithms in consideration of color information and fusing a plurality of scores obtained respectively from the matching algorithms in order to verify a query image of an object using the matching algorithms.

The present invention also provides an object verification apparatus and method which can enhance verification performance by normalizing a plurality of scores obtained respectively from a plurality of matching algorithms to be dependent on a query image of an object, estimating weights of the normalized scores based on respective EERs, and fusing the normalized scores based on the estimated weights in order to verify the query image using the matching algorithms.

The present invention also provides an object verification apparatus and method which can enhance verification performance by performing a plurality of matching algorithms in consideration of color information, normalizing a plurality of scores obtained respectively from a plurality of matching algorithms to be dependent on a query image of an object, and fusing the normalized scores in order to verify the query image using the matching algorithms.

The present invention also provides an object verification apparatus and method which can enhance verification performance by performing a plurality of matching algorithms in consideration of color information, estimating weights of a plurality of scores obtained respectively from the matching algorithms based on respective EERs, and fusing the scores based on the estimated weights in order to verify the query image using the matching algorithms.

The present invention also provides an object verification apparatus and method which can enhance verification performance by performing a plurality of matching algorithms in consideration of color information, normalizing a plurality of scores obtained respectively from a plurality of matching algorithms to be dependent on a query image of an object, estimating weights of the normalized scores based on respective EERs, and fusing the normalized scores based on the estimated weights in order to verify the query image using the matching algorithms.

According to an aspect of the present invention, there is provided an object verification apparatus including a matching unit performing a plurality of different matching algorithms on a query image and generating a plurality of scores; a score normalization unit normalizing each of the generated scores to be adaptive to the query image; a weight estimation unit estimating weights of the normalized scores based on the respective matching algorithms applied; and a score fusion unit fusing the normalized scores by respectively applying the weights estimated by the weight estimation unit to the normalized scores.

According to another aspect of the present invention, there is provided an object verification method including performing a plurality of different matching algorithms on a query image and generating a plurality of scores; normalizing each of the generated scores to be adaptive to the query image; estimating weights of the normalized scores based on the respective matching algorithms applied; and fusing the normalized scores by respectively applying the estimated weights to the normalized scores.

According to another aspect of the present invention, there is provided a computer-readable recording medium on which a program for executing the object verification method on a computer is recorded.

BRIEF DESCRIPTION OF THE DRAWINGS

The above and other features and advantages of the present invention will become more apparent by describing in detail exemplary embodiments thereof with reference to the attached drawings in which:

FIG. 3 is a block diagram of a first matching part of the matching unit illustrated in FIG. 1 according to another embodiment of the present invention;

FIGS. 4A and 4B are graphs comparing conventional score normalization with score normalization according to an embodiment of the present invention;

DETAILED DESCRIPTION OF THE INVENTION

The present invention will now be described more fully with reference to the accompanying drawings, in which exemplary embodiments of the invention are shown. The invention may, however, be embodied in many different forms, and should not be construed as being limited to the embodiments set forth therein; rather, these embodiments are provided so that this disclosure will be thorough and complete, and will fully convey the concept of the invention to those skilled in the art.

Figure 1:
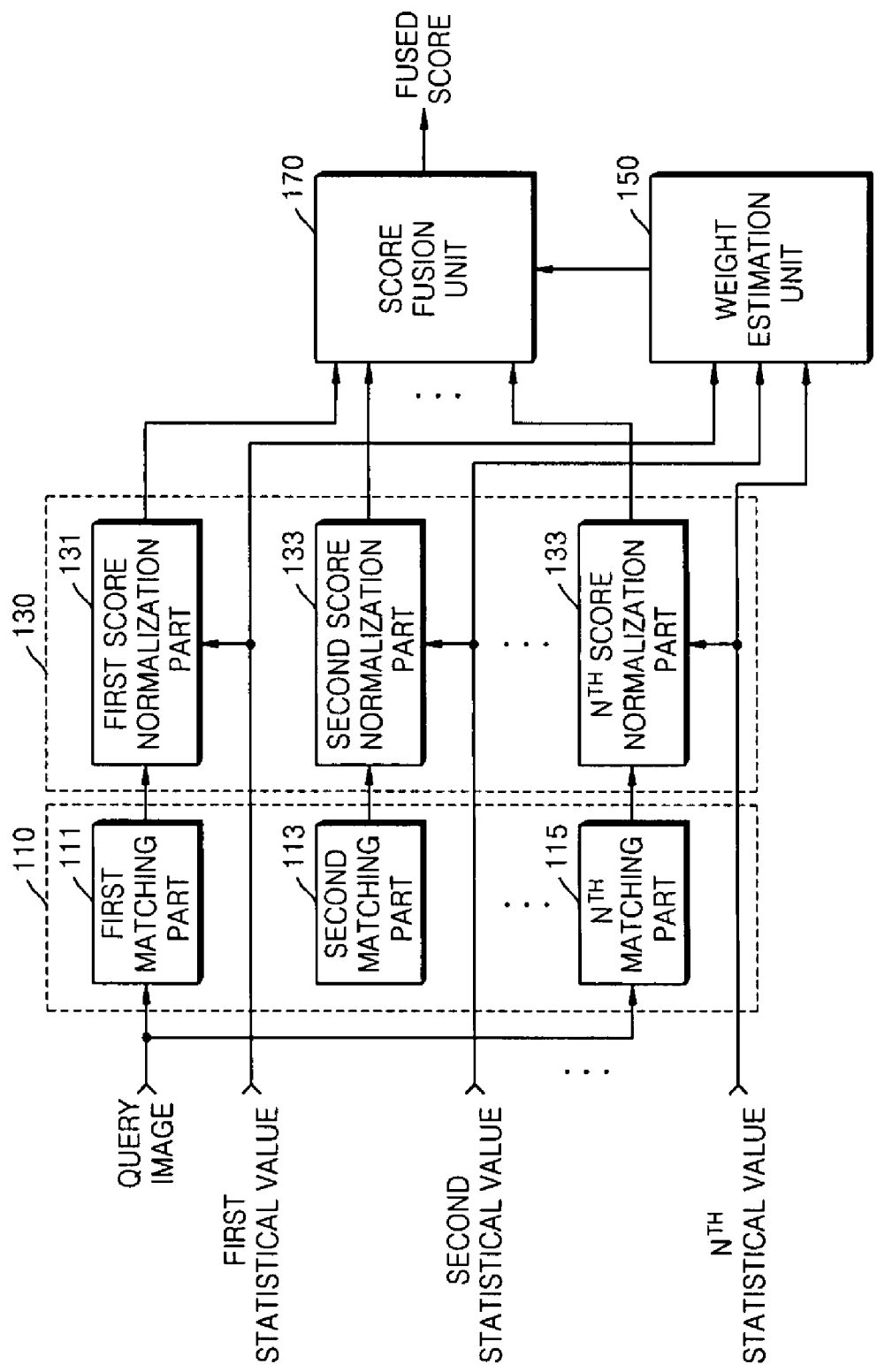
FIG. 1 is a block diagram of an object verification apparatus according to an embodiment of the present invention.

FIG. 1 is a block diagram of an object verification apparatus according to an embodiment of the present invention. The object verification apparatus includes a matching unit 110, a score normalization unit 130, a weight estimation unit 150, and a score fusion unit 170. The matching unit 110 includes first through $n^{th}$ matching parts 111 through 115, and the score normalization unit 130 includes first through $n^{th}$ score normalization parts 131 through 135. The first through $n^{th}$ matching parts 111 through 115 may perform different matching algorithms on the same biometric feature of the same person. Alternatively, the first through $n^{th}$ matching parts 111 through 115 may perform each matching algorithm on different biometric features of the same person. Alternatively, the first through $n^{th}$ matching parts 111 through 115 may perform different matching algorithms on different biometric features of the same person.

Referring to FIG. 1, each of the first through $n^{th}$ matching parts 111 through 115 included in the matching unit 110 performs its preset matching algorithm on a query image with reference to a registration image database (DB) (not shown) and generates an individual score. The query image and the registration image are both color images. According to an embodiment of the present invention, red (R), green (G), and blue (B) channel images are obtained from a query image, and a matching algorithm is performed on each of the RGB channel images. Then, respective matching scores of the RGB channel images are fused into an individual score. According to another embodiment of the present invention, a grayscale image is generated by assigning different weights to RGB channel images obtained from a query image. Then, a matching algorithm is performed on the grayscale image, thereby generating an individual score.

The first through $n^{th}$ score normalization parts 131 through 135 included in the score normalization unit 130 receive individual scores respectively from the first through $n^{th}$ matching parts 111 through 115, and normalize the received scores using respective first through $n^{th}$ statistics, which are calculated in advance. Then, the first through $n^{th}$ score normalization parts 131 through 135 provide the normalized scores to the score fusion unit 170.

The first through $n^{th}$ statistics are information obtained in advance through a training process. After a matching algorithm corresponding to each of the first through $n^{th}$ matching parts 111 through 115 is performed on a training image set, a score distribution is obtained. Then, parameters such as the mean, variance, standard deviation, maximum value, minimum value, false acceptance rate (FAR), false rejection rate (FRR), and equal error rate (EER) etc. are extracted from the score distribution. In this case, each parameter may vary according to a threshold value used in a matching algorithm. In particular, the EER is defined as the point at which the FAR is equal to the FRR. The ERR is used to evaluate verification performance. As the threshold value is increased, the FRR increases, but the FAR decreases. Conversely, as the threshold value is decreased, the FRR decreases while the FAR increases. Therefore, the threshold value is determined in consideration of a trade-off between the FRR and the FAR, as well as the application field of the object verification apparatus. The EER indicates how well the object verification apparatus is modeled. A low EER indicates good modeling, and guarantees high verification performance, and a high EER indicates poor modeling. The first through $n^{th}$ score normalization parts 131 through 135 do not use the same parameter for each individual score. Instead, they normalize the individual scores using different normalization parameters for each query image. Specifically, the first score normalization part 131 uses first statistics to normalize, for example, first and second query images. However, since the distribution of individual scores obtained from the first query image differs from that of individual scores obtained from the second query image, a score normalization parameter of the first query image also differs from that of the second query image. In other words, while the first through $n^{th}$ score normalization parts 131 through 135 may all use the same statistics, they each set a different score normalization parameter according to the distribution of individual scores obtained from each query image.

The weight estimation unit 150 estimates a weight of each individual score based on the EER included in each of the first through $n^{th}$ statistics which are calculated in advance. In other words, the weight estimation unit 150 assigns a different weight to each individual score according to the EER used to evaluate the verification performance of each of the first through $n^{th}$ matching parts 111 through 115.

The score fusion unit 170 respectively applies the weights provided by the weight estimation unit 150 to the normalized individual scores provided by the first through $n^{th}$ score normalization parts 131 through 135, and fuses the scores through weighted sum calculation.

Figure 2:
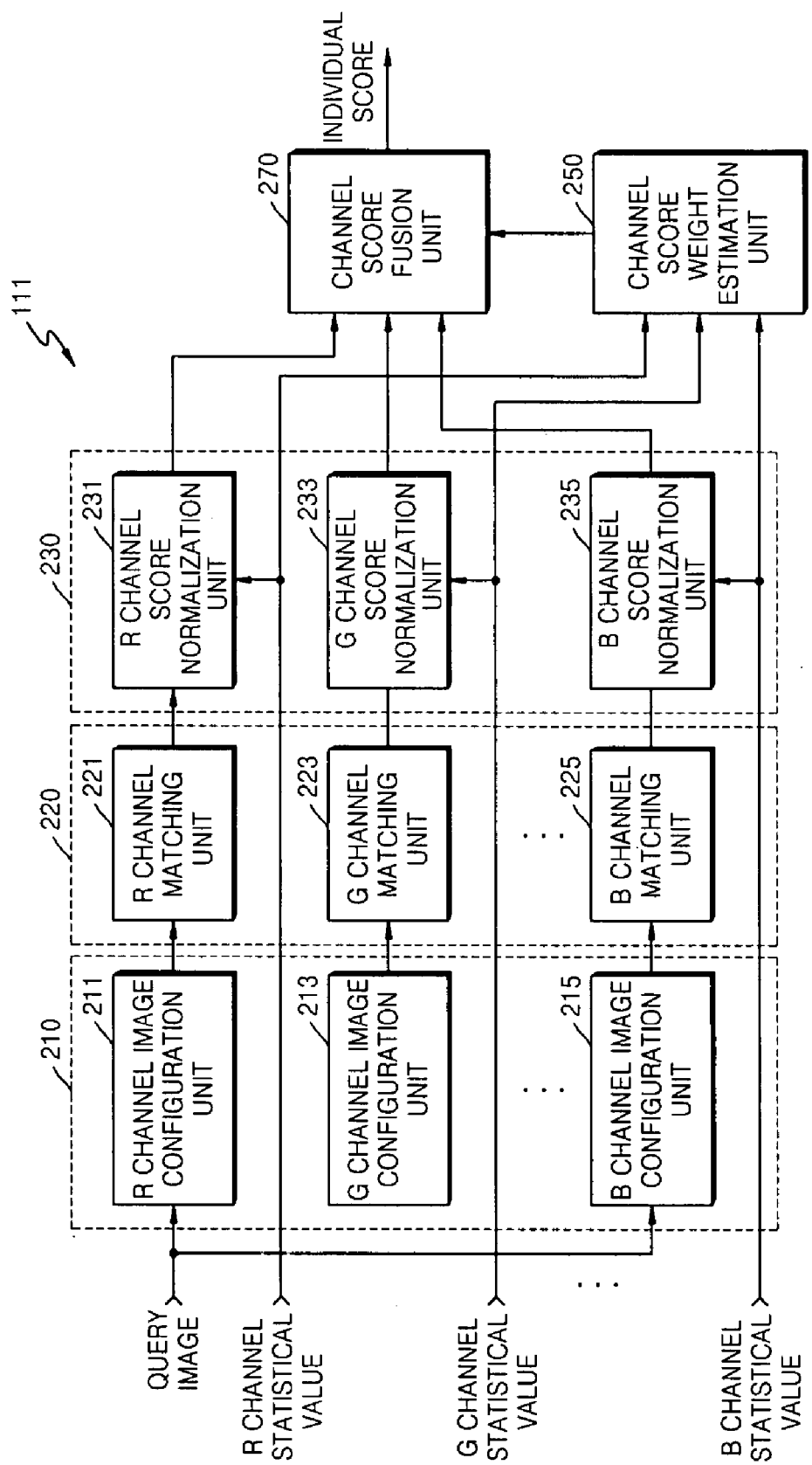
FIG. 2 is a block diagram of a first matching part of a matching unit illustrated in FIG. 1 according to an embodiment of the present invention.

FIG. 2 is a block diagram of the first matching part 111 of the matching unit 110 illustrated in FIG. 1 according to an embodiment of the present invention. The first matching part 111 includes a first channel image configuration unit 210, a channel matching unit 220, a channel score normalization unit 230, a channel score weight estimation unit 250, and a channel score fusion unit 270. In FIG. 2, the first matching part 111 is used as an example. However, the same configuration may be applied to the second through $n^{th}$ matching parts 113 through 115.

Referring to FIG. 2, an R channel image configuration unit 211, a G channel image configuration unit 213, and a B channel image configuration unit 215 included in the first channel image configuration unit 210 respectively extract R, G and B components from a query image and configure R, G, and B channel images.

An R channel matching unit 221, a G channel matching unit 223, and a B channel matching unit 225 included in the channel matching unit 220 respectively apply a matching algorithm to the R, G and B channel images provided by the R, G and B channel image configuration units 211, 213 and 215, and obtain R, G and B channel scores.

An R channel score normalization unit 231, a G channel score normalization unit 233, and a B channel score normalization unit 235 included in the channel score normalization unit 230 respectively normalize the R, G and B channel scores provided by the R, G and B channel matching units 221, 223 and 225 using R, G and B channel statistics, which are obtained in advance, and provide the normalized R, G and B channel scores to the channel score fusion unit 270. Like the first through $n^{th}$ statistics, the R, G and B channel statistics are information obtained in advance through a training process. The information is obtained from the distribution of individual channel scores which are obtained after the R, G and B channel matching units 221, 223 and 225 perform their respective matching algorithms on a training image set.

The channel score weight estimation unit 250 estimates the respective weights of the R, G and B channel scores provided by the R, G and B channel score normalization units 231, 233 and 235 using the R, G and B channel statistics. Like the weight estimation unit 150 illustrated in FIG. 1, the channel score weight estimation unit 250 estimates the weight of each channel score based on the EER. That is, the channel score weight estimation unit 250 assigns different weights to the R, G and B channel scores based on the EER, which is used to evaluate the verification performance of each of the R, G and B channel matching units 221, 223 and 225, and in consideration of the contribution of each channel image to channel score fusion.

The channel score fusion unit 270 applies the weights provided by the channel score weight estimation unit 250 respectively to the normalized R, G and B channel scores provided by the R, G and B channel score normalization units 231, 233 and 235, fuses the R, G and B channel scores through weighted sum calculation, to thus generate an individual score for a query image.

If the R, G and B channel scores are obtained after a matching algorithm is performed on each of the R, G and B channel images of a query image, and if the R, G and B channel scores are fused by applying different weights to the R, G and B channel scores according to their contributions to verification performance as described above, then the verification rate can be increased by approximately 3 to 6% compared with the prior art in which a matching algorithm is performed on a grayscale image generated by assigning the same channel weights.

FIG. 3 is a block diagram of the first matching part 111 of the matching unit 110 illustrated in FIG. 1 according to another embodiment of the present invention. The first matching part 111 includes a second channel image configuration unit 310, a channel weight estimation unit 330, a channel image fusion unit 350, and a sub-matching unit 370. In FIG. 3, the first matching part 111 is used as an example. However, the same configuration may be applied to the second through $n^{th}$ matching parts 113 through 115.

Referring to FIG. 3, an R channel image configuration unit 311, a G channel image configuration unit 313, and a B channel image configuration unit 315 included in the second channel image configuration unit 310 respectively extract R, G and B components from a query image and configure R, G, and B channel images.

The channel weight estimation unit 330 estimates the respective weights of the R, G and B channel images using R, G and B channel statistics, which are obtained in advance. Like the channel score weight estimation unit 250 illustrated in FIG. 1, the channel weight estimation unit 330 estimates the weight of each channel image based on the EER and the contribution of each channel image to verification performance.

The channel image fusion unit 350 applies the weights provided by the channel weight estimation unit 330 respectively to the R, G and B channel images provided by the R, G and B channel image configuration units 311, 313 and 315, fuses the R, G and B channel images through weighted sum calculation, and thus generates a grayscale image for a query image. A grayscale image I generated by the channel image fusion unit 350 is given by Equation (1).

$$I = \text{Ratio}_R * R + \text{Ratio}_G * G + \text{Ratio}_B * B, \quad (1)$$

where the weights $\text{Ratio}_R$, $\text{Ratio}_G$ and $\text{Ratio}_B$ of R, G and B channel images are estimated based on the EER depending on their respective contribution to the fusion of the R, G and B channel images. For example, when a matching algorithm, such as a motion picture experts group-7 advanced face descriptor (ADMPEG7), is used, 0.5740, 0.3559, and 0.0701 are respectively assigned to the weights $\text{Ratio}_R$, $\text{Ratio}_G$ and $\text{Ratio}_B$ based on the respective high, intermediate, and low contributions of the R, G and B channel images to verification performance.

The sub-matching unit 370 performs a matching algorithm on the grayscale image provided by the channel image fusion unit 350 and obtains an individual score for a query image.

If a matching algorithm is applied to a grayscale image obtained after the R, G and B channel images are fused by assigning different weights thereto as described above, the verification rate can be increased by approximately 2 to 4% without increasing calculation time, compared with the prior art in which a matching algorithm is performed on a grayscale image generated by assigning the same channel weight.

Figure 4A:
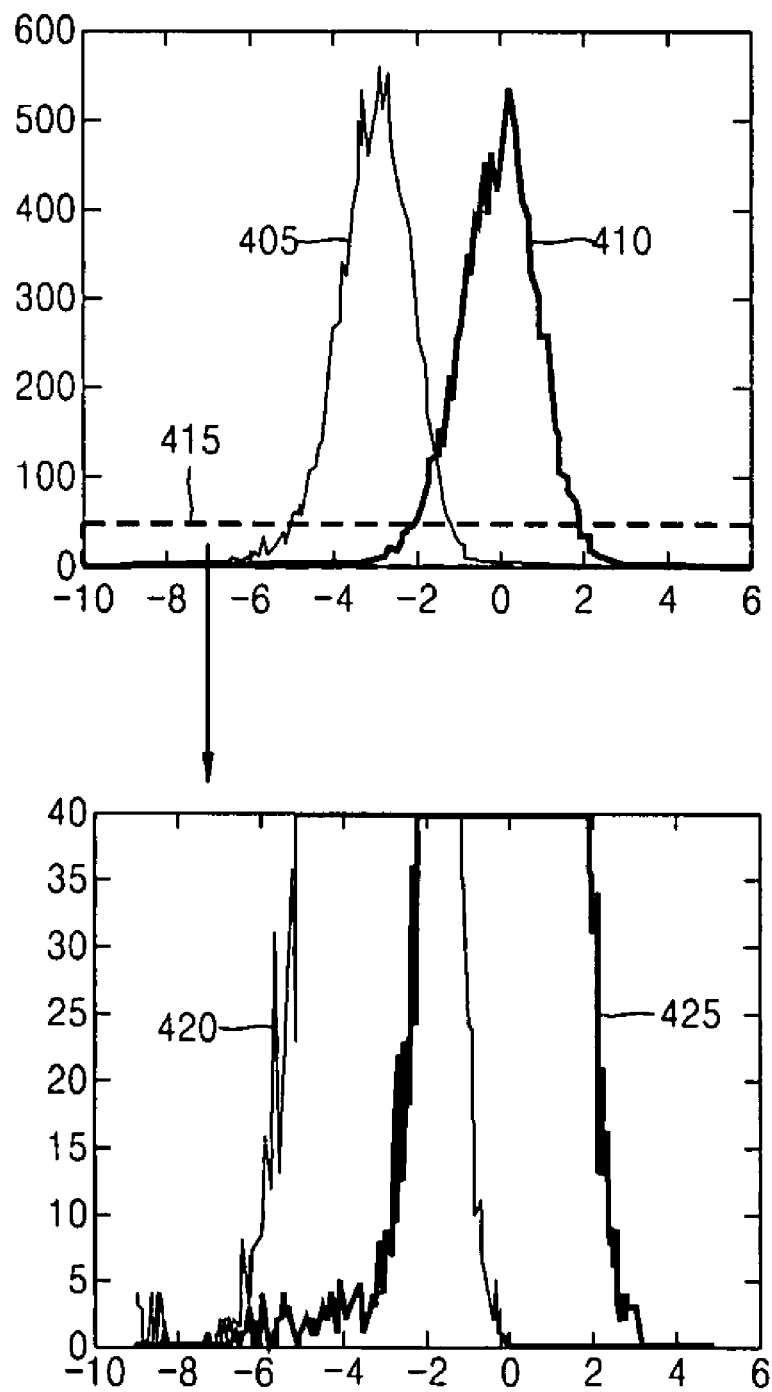

FIGS. 4A and 4B are graphs comparing conventional score normalization with score normalization according to an embodiment of the present invention. According to the prior art illustrated in FIG. 4A, a single matching part, for example the first matching part 111, uses the same normalization parameter, excluding the possibility that score distributions of all registration images stored in a database (DB) (not shown) can be different from that of each query image. Consequently, the normalized score distribution 405 of a first query image is different from the normalized score distribution 410 of a second query image. In other words, referring to the bottom part of FIG. 4A, which shows an enlargement of the lower portions 420 and 425 of the normalized score distributions 405 and 410, since the threshold values for determining a match and a non-match are different for each of the query images, the verification rate is reduced. On the other hand, according to the present invention illustrated in FIG. 4B, a single matching part, for example the first matching part 111, uses a different normalization parameter for each query image, in consideration of the possibility that the score distributions of all registration images stored in a DB (not shown) can be different from that of each query image. In other words, the score distribution of a query image may vary according to the image subject or the quality of the query image, which is affected by blurring, lighting or makeup. Therefore, a different normalization parameter is used for each query image. Consequently, the normalized score distribution 430 of a first query image and the normalized score distribution 435 of a second query image are almost equal. In other words, referring to the bottom part of FIG. 4B, which shows an enlargement of the lower portions 445 and 450 of the normalized score distributions 430 and 435, since threshold values for determining a match and a non-match are almost identical for each of the query images, the verification rate is increased.

Various conventional algorithms, such as a min-max algorithm, a Z-score algorithm, a median and median deviation algorithm, a double sigmoid algorithm, and a hyper tangent algorithm, may be applied to score normalization. Preferably, the Z-score algorithm, which is not greatly affect by outliers, is used.

Figure 5:
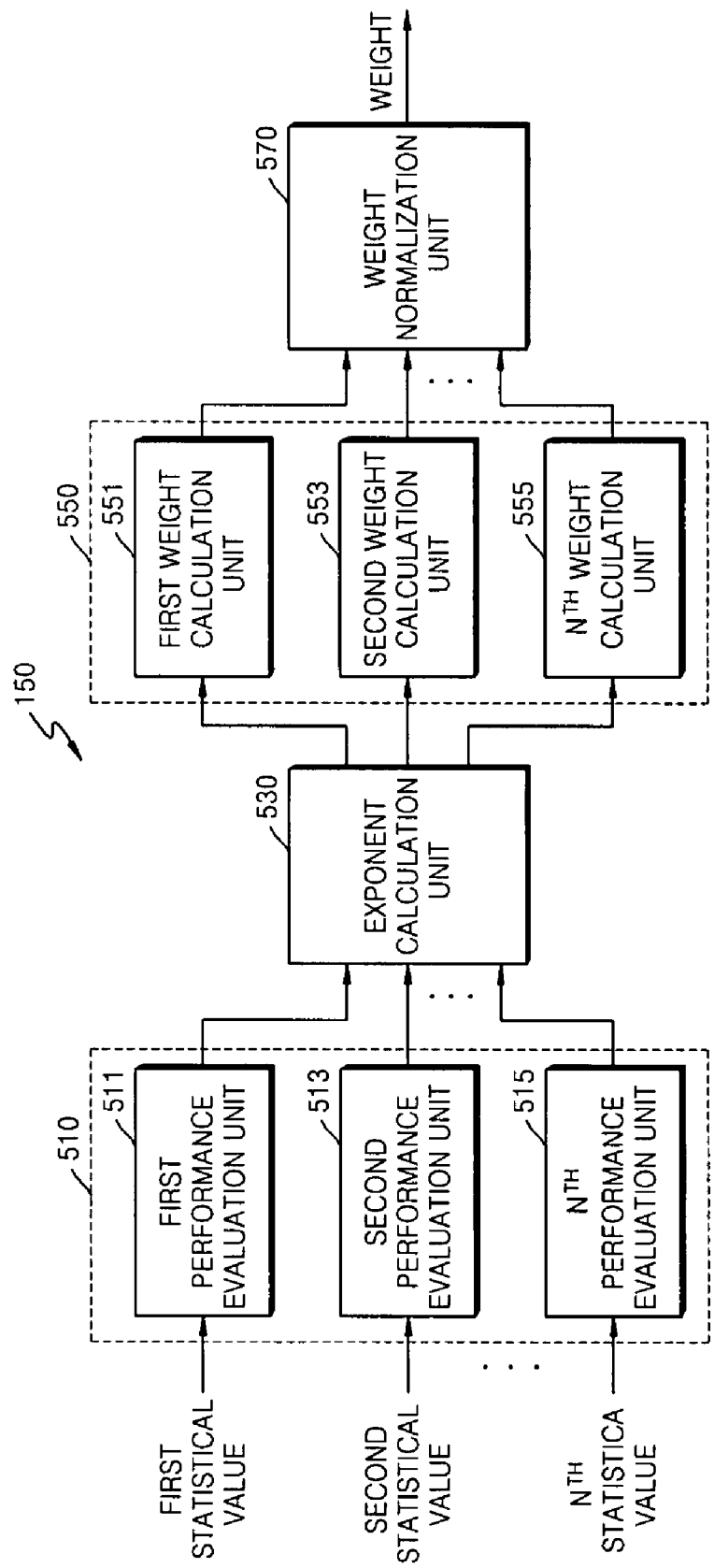
FIG. 5 is a block diagram of a weight estimation unit illustrated in FIG. 1 according to an embodiment of the present invention.

FIG. 5 is a block diagram of the weight estimation unit 150 illustrated in FIG. 1 according to an embodiment of the present invention. The weight estimation unit 150 includes a performance evaluation unit 510, an exponent calculation unit 530, a weight calculation unit 550, and a weight normalization unit 570. The basic principle of the weight estimation unit 150 illustrated in FIG. 5 may also be applied to the channel score weight estimation unit 250 illustrated in FIG. 2 and the channel weight estimation unit 350 illustrated in FIG. 3.

Referring to FIG. 5, first through $n^{th}$ performance evaluation parts 511 through 515 included in the performance evaluation unit 510 calculate ERRs based on first through $n^{th}$ statistics respectively corresponding to the first through $n^{th}$ matching parts 111 through 115 illustrated in FIG. 1, in order to evaluate the verification performance of the first through $n^{th}$ matching parts 111 through 115.

The exponent calculation unit 530 calculates a weight exponent using the mean value of the respective EERs of the first through $n^{th}$ matching parts 111 through 115. The weight exponent $I_e$ may be given by Equation (2).

$$I_e = a * E(\text{EER}_m)^2 + b * E(\text{EER}_m) + c$$

$$E(\text{EER}_m) = \max(3 + \log \text{EER}_m, 0), \quad (2)$$

where $\text{EER}_m$ indicates the mean value of the respective EERs of the first through $n^{th}$ matching parts 111 through 115. In addition, constants a, b and c may be optimized in advance using a training image set. In the present embodiment, a=−0.5, b=−0.5, and c=0.

First through $n^{th}$ weight calculation parts 551 through 555 included in the weight calculation unit 550 calculate the weight of each of the first through $n^{th}$ matching parts 111 through 115 using the $\text{EER}_i$ of each of the first through $n^{th}$ matching parts 111 through 115 and the weight exponent $I_e$ provided by the exponent calculation unit 530. In this case, a weight $W_i$ may be given by Equation (3).

$$W_i = \text{EER}_i^{I_e} \quad (3).$$

The weight normalization unit 570 normalizes the weight of each of the first through $n^{th}$ matching parts 111 through 115 provided by the weight calculation unit 550. In this case, a normalized weight $w_i$ may be given by Equation (4).

$$w_i = \frac{W_i}{\sum_{j=1}^{N} W_j}. \qquad (4)$$

Figure 6A:
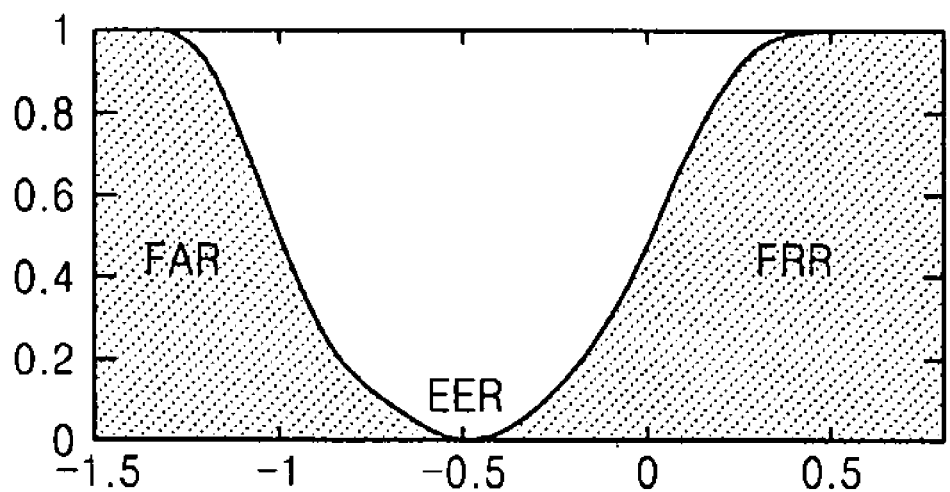
FIGS. 6A and 6B are graphs for explaining parameters used by the weight estimation unit of FIG. 5.
Figure 6B:
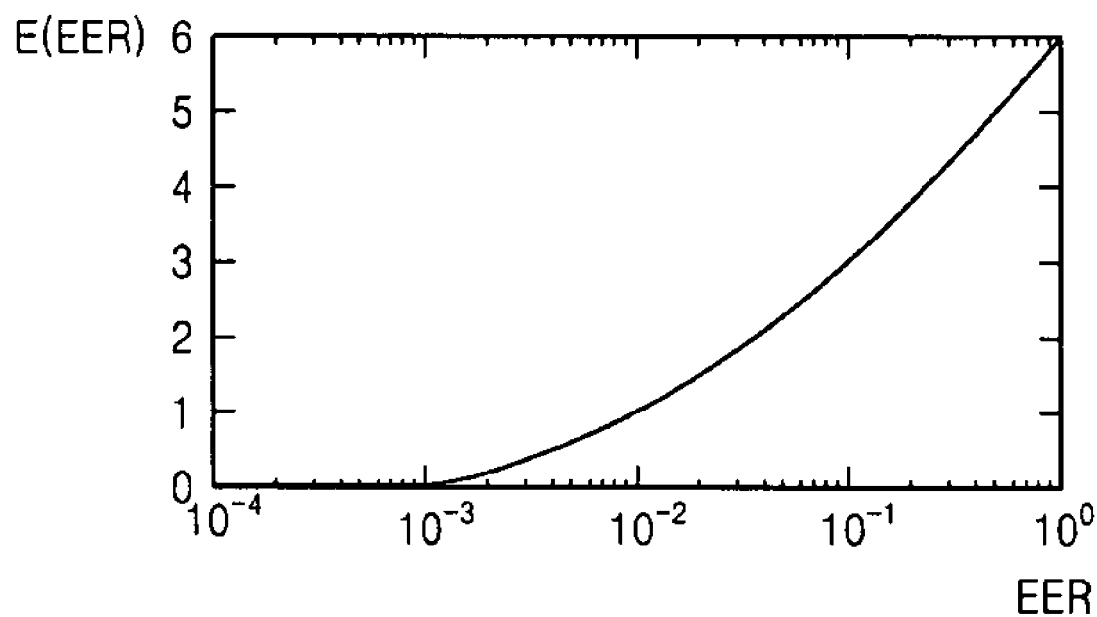

FIGS. 6A and 6B are graphs for explaining parameters used by the weight estimation unit 150 of FIG. 5. Specifically, FIG. 6A illustrates the relationship between the FAR, FRR, and EER. FIG. 6B illustrates the relationship between the E(EER) and EER.

An experiment conducted to compare the performance of an object verification method according to the present invention with that of a conventional object verification method will now be described. In this experiment, a DB version 2.0 of face recognition grand challenge (FRGC) was used.

Table 1 relates to the case where each of the first through $n^{th}$ matching parts 111 through 115 illustrated in FIG. 1 used a matching algorithm such as ADMPEG7. In this case, Table 1 compares EERs and verification rates (VRs) when each channel image was used, when a method of fusing respective scores of the channel images of a color image according to the present invention (RGB score fusion: present invention 1) was used, when a conventional method of fusing the channel images of the color image (channel image fusion: prior art) was used, and when a method of fusing the channel images of the color image according to the present invention (channel image fusion: present invention 2) was used.

TABLE 1

|  | R Channel Image | G Channel Image | B Channel Image | Channel Image Score Fusion (Present Invention 1) | Channel Image Fusion (Prior Art) | Channel Image Fusion (Present Invention 2) |
|---|---|---|---|---|---|---|
| EER | 0.0454% | 0.0512% | 0.0773% | 0.0406% | 0.0470% | 0.0404% |
| VR (FAR = 0.001) | 0.6306% | 0.5982% | 0.4571% | 0.6780% | 0.6192% | 0.6576% |

Figure 7:
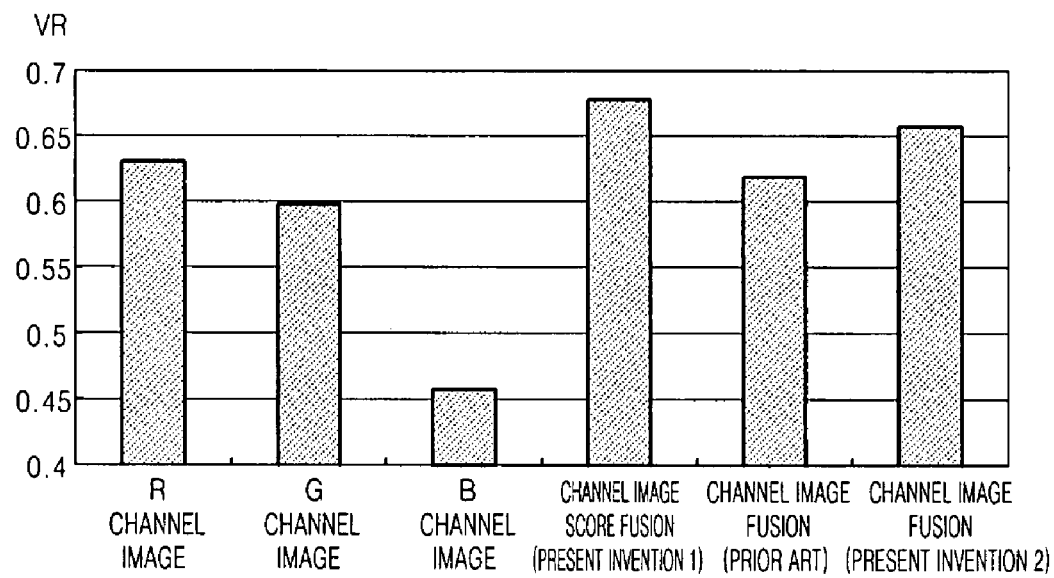
FIG. 7 is a graph comparing a verification rate (VR) when a conventional channel image score fusion method is applied to a high-speed matching algorithm with a VR when a channel image score fusion method according to the present invention is applied to the high-speed matching algorithm.

FIG. 7 is a graph illustrating the VR of each method in order to easily compare the performance of the methods shown in Table 1. Referring to FIG. 7, when an individual channel image is used, the R channel image results in the highest VR. In addition, when channel image scores are fused or channel images are fused, according to the present invention, the EER is reduced and the VR is increased, compared with when the R channel image only is used or when channel images are fused according to the prior art. Consequently, verification performance is enhanced.

Table 2 relates to the case where each of the first through $n^{th}$ matching parts 111 through 115 illustrated in FIG. 1 used a matching algorithm such as a mixture of a Gabor filter and linear discriminant analysis (LDA). In this case, Table 2 compares EERs and VRs when each channel image was used, when a method of fusing respective scores of the channel images of a color image according to the present invention (RGB score fusion: present invention 1) was used, when a conventional method of fusing the channel images of the color image (channel image fusion: prior art) was used, and when a method of fusing the channel images of the color image according to the present invention (channel image fusion: present invention 2) was used.

TABLE 2

|  | R Channel Image | G Channel Image | B Channel Image | Channel Image Score Fusion (Present Invention 1) | Channel Image Fusion (Prior Art) | Channel Image Fusion (Present Invention 2) |
|---|---|---|---|---|---|---|
| EER | 0.0610% | 0.0668% | 0.0792% | 0.0513% | 0.0667% | 0.0631% |
| VR (FAR = 0.001) | 0.5501% | 0.5398% | 0.3975% | 0.6042% | 0.5402% | 0.5790% |

Figure 8:
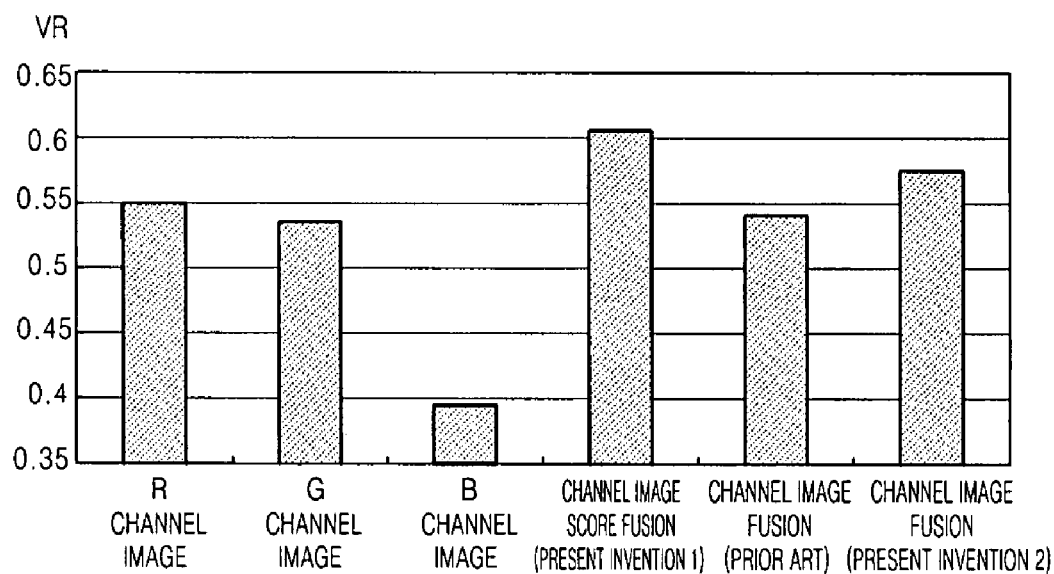
FIG. 8 is a graph comparing a VR when a conventional channel image score fusion method is applied to a low-speed matching algorithm with a VR when a channel image score fusion method according to the present invention is applied to the low-speed matching algorithm.

FIG. 8 is a graph illustrating the VR of each method in order to easily compare the performance of the methods shown in Table 2. Referring to FIG. 8, when an individual channel image is used, the R channel image results in the highest VR as FIG. 7. In addition, when channel image scores are fused or channel images are fused according to the present invention, the EER is reduced and the VR is increased, compared with when the R channel image only is used or when channel images are fused according to the prior art. Consequently, verification performance is enhanced. When the method of fusing channel image scores (present invention 1) is applied while the mixture of the Gabor filter and the LDA is used, the processing speed is significantly reduced. Therefore, it is desirable to use the method of fusing channel images (present invention 2).

Table 3 compares VRs of various matching algorithms when score normalization dependent on a score matrix (prior art) and score normalization dependent on a query image (present invention) were performed on data group 1 having normal image quality and data group 2 having low image quality

TABLE 3

| | Matching Algorithm | VR Resulted from Conventional Score Normalization | VR Resulted from Score Normalization According to Present Invention | VR Enhancement (%) |
|---|---|---|---|---|
| Data Group 1 | SAIT_Garbor + LDA | 85.7080% | 90.8222% | 5.1142% |
| | ADMPEG-7 | 83.2155% | 88.4071% | 5.1916% |
| | Kernel LBP | 93.8373% | 97.4055% | 3.5682% |
| Data Group 2 | SAIT_Garbor + LDA | 55.4852% | 69.4149% | 13.9297% |
| | ADMPEG-7 | 42.1369% | 61.5093% | 19.3724% |
| | Kernel Garbor | 51.7100% | 55.3985% | 3.6885% |

Figure 9A:
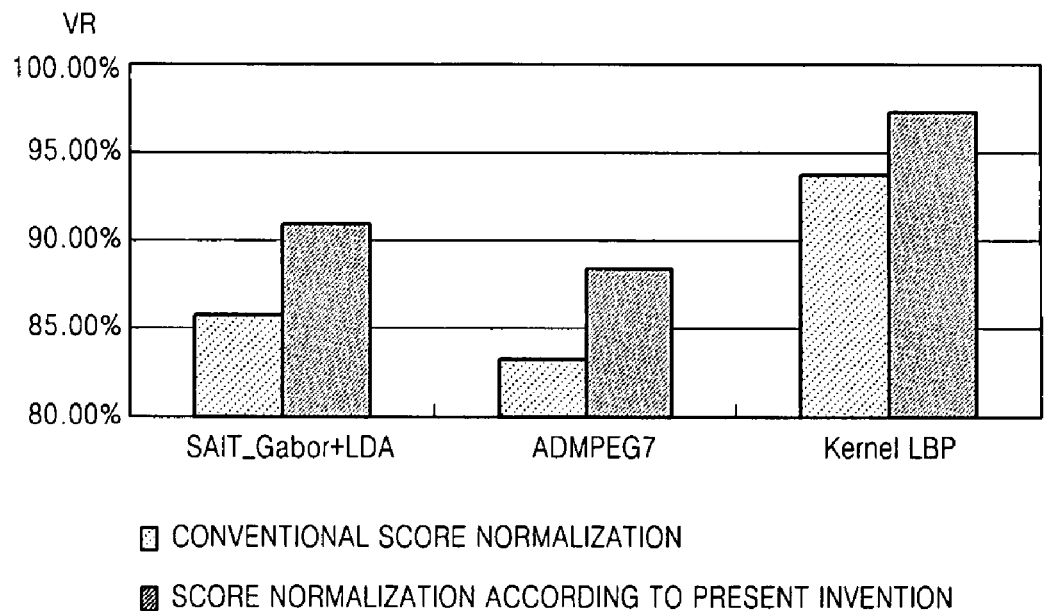
FIGS. 9A and 9B are graphs comparing a VR when a conventional score normalization method is applied with a VR when a score normalization method according to the present invention is applied.
Figure 9B:
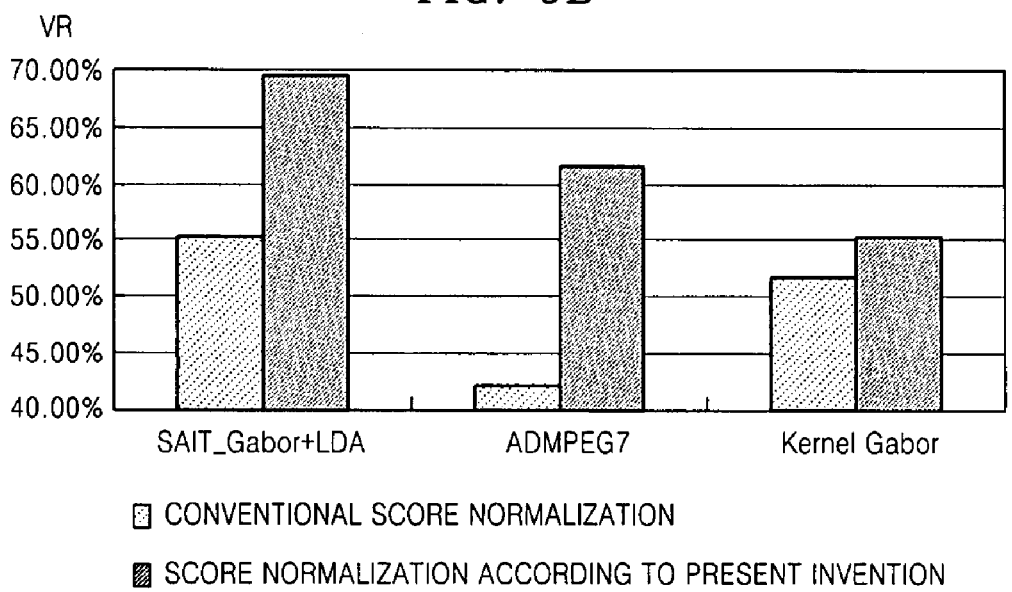

FIGS. 9A and 9B are graphs illustrating the VR of each method in order to easily compare the performance of the methods shown in Table 3. Referring to FIG. 9A, after score normalization according to the present invention was performed on data groups showing relatively high VRs, i.e. more than 80%, the VRs of the data groups were increased by approximately 4 to 5%. In particular, referring to FIG. 9B, after score normalization according to the present invention was performed on data groups showing relatively low VRs, i.e. more than 70%, the VRs of the data groups were increased by approximately 4 to 20%.

Table 4 compares VRs of fusion group 1 and fusion group 2 when conventional FAR-FRR based, LDA based and recognition rate based weight estimation methods and an EER-based weight estimation method according to the present invention were used. Fusion group 1 fuses scores obtained using SAIT_Garbor+LDA, ADMPEG7, and Kernel linear pattern (LBP) matching algorithms. Fusion group 2 fuses scores obtained using SAIT_Garbor+LDA, ADMPEG7, and Beigjing_Garbor+LDA matching algorithms.

TABLE 4

| | FAR-FRR Based | LDA Based | Recognition Rate Based | EER Based |
|---|---|---|---|---|
| Fusion Group 1 | 95.954% | 93.736% | 92.126% | 97.879% |
| Fusion Group 2 | 78.027% | 76.004% | 74.097% | 80.890% |

Figure 10:
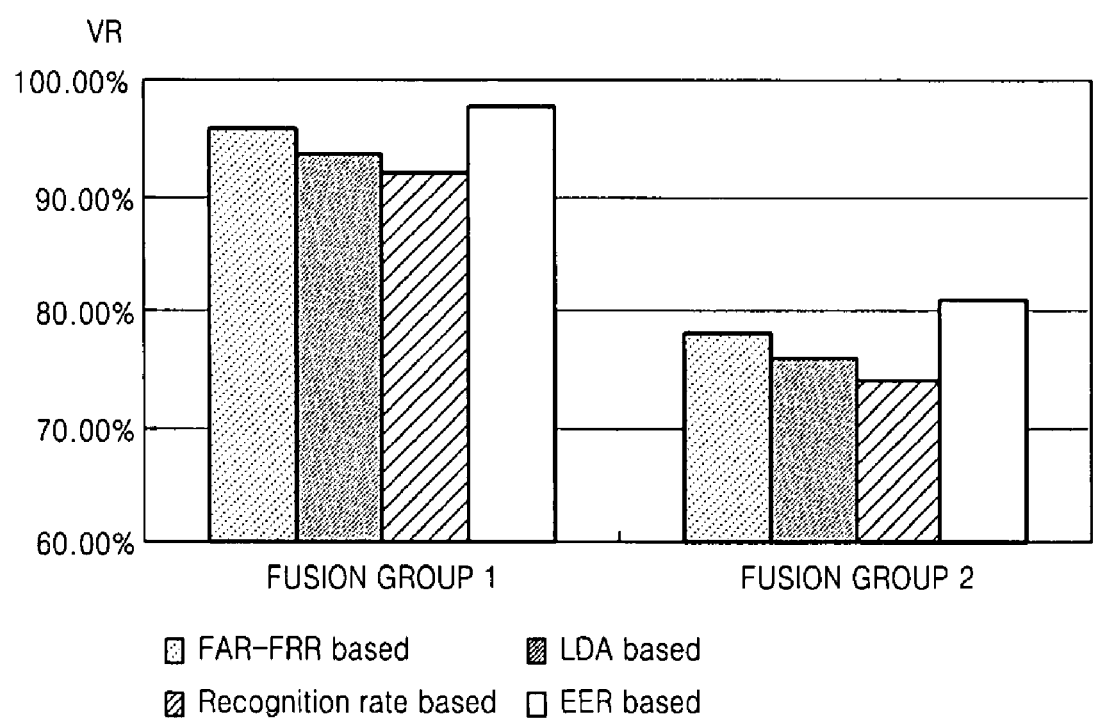
FIG. 10 is a graph comparing a VR when a conventional weight estimation method is applied with a VR when a weight estimation method according to the present invention is applied

FIG. 10 is a graph illustrating the VR of each method in order to easily compare the performance of the methods shown in Table 4. Referring to FIG. 10, it can be understood that verification performance is enhanced when the EER-based weight estimation method according to the present invention is used to fuse scores.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, code, and code segments for accomplishing the present invention can be easily construed by programmers skilled in the art to which the present invention pertains.

As described above, according to the present invention, when a query image of an object is verified using a plurality of matching algorithms, verification performance using a fused score can be significantly enhanced by combining one or more of a process of performing a matching algorithm in consideration of color information, a process of performing adaptive score normalization on a query image, and a process of estimating the weight of a score obtained using each EER-based matching algorithm.

The present invention can be widely applied to pre-processing of all application fields of object recognition. For example, the present invention can be applied to credit cards, cash cards, electronic ID cards, cards that require identity authentication, terminal access control, public access control systems, electronic photo-albums, criminal photograph recognition, and even automatic focusing of a digital camera.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An object verification apparatus having computing device-executable instructions comprising:
    a processor to control one or more processor-executable units
    a matching unit to perform a plurality of different matching algorithms on a query image and generating a plurality of scores;
    a score normalization unit to normalize each of the generated scores to be adaptive to the quality of the query image by using a different normalization parameter;
    a weight estimation unit, controlled by the processor, to estimate weights of the normalized scores based on the respective matching algorithms applied; and
    a score fusion unit to fuse the normalized scores by respectively applying the weights estimated by the weight estimation unit to the normalized scores,
    wherein the weight estimation unit comprises:
    a performance evaluation unit to calculate an equal error rate (EER) of each matching algorithm in order to evaluate performance of each matching algorithm;
    an exponent calculation unit to calculate a weight exponent using a mean value of the calculated EERs;
    a weight calculation unit to calculate a weight of each matching algorithm using the EER of each matching algorithm and the weight exponent; and
    a weight normalization unit normalizing the weight of each matching algorithm, and
    the weight exponent is calculated using $Ie=a*E(EERm)2+b*E(EER)+c$, $E(EER)=max(3+\log EERm, 0)$ wherein IE indicates a weight exponent, EERm indicates a mean value of the respective EERs of the matching algorithms, and a, b and c indicate constants.

2. The apparatus of claim 1, wherein the matching unit performs the matching algorithms in consideration of color information of the query image.

3. The apparatus of claim 1, wherein the matching unit comprises:
    a channel image configuration unit to configure red (R), green (G) and blue (B) channel images from the query image;
    a channel matching unit to perform a matching algorithm on the R, G and B channel images and generating R, G and B channel scores;

a channel normalization unit to normalize the R, G and B channel scores;

a channel score weight estimation unit to estimate a weight of each of the normalized R, G and B channel scores based on an equal error rate (EER) and contribution of each of the normalized R, G and B channel images; and a channel score fusion unit to fuse the normalized R, G and B channel scores using the weights thereof.

4. The apparatus of claim 3, wherein the weight estimation unit uses the EER according to each matching algorithm.

5. The apparatus of claim 1, wherein the matching unit comprises:

a channel image configuration unit to configure R, G and B channel images from the query image;

a channel weight estimation unit to estimate a weight of each of the R, G and B channel images based on an EER and contribution of each of the R, G and B channel images;

a channel image fusion unit to fuse the R, G and B channel images using the weights thereof and generating a grayscale image; and a sub-matching unit to perform a matching algorithm on the grayscale image and generating a score of the query image.

6. The apparatus of claim 5, wherein the weight estimation unit uses the EER according to each matching algorithm.

7. An object verification method comprising:

performing, by a processor, a plurality of different matching algorithms on a query image and generating a plurality of scores;

normalizing each of the generated scores to be adaptive to the quality of the query image by using a different normalization parameter;

estimating, performed by a processor having computing devie-executable instructions, weights of the normalized scores based on the respective matching algorithms applied; and fusing the normalized scores by respectively applying the estimated weights to the normalized scores, wherein the estimating of the weights comprises:

calculating an equal error rate (EER) of each matching algorithm in order to evaluate performance of each matching algorithm;

calculating a weight exponent using a mean value of the calculated EERs;

calculating a weight of each matching algorithm using the EER of each matching algorithm and the weight exponent; and normalizing the weight of each matching algorithm, and the calculating of the weight exponent is performed using Ie=a*E(EERm)2+b*E(EER)+c, E(EER)=max(3+log EERm, 0) wherein IE indicates a weight exponent, EERm indicates a mean value of the respective EERs of the matching algorithms, and a, b and c indicate constants.

8. The method of claim 7, wherein the matching algorithms are performed in consideration of color information of the query image, in the performing of the matching algorithms on the query image and the generating of the scores.

9. The method of claim 7, wherein the estimating of the weights is performed using $W_i = EER_i^{I_e}$, where $I_e$ indicates a weight exponent, $W_i$ indicates a calculated weight, and $EER_i$ indicates the EER of an i-th matching algorithm.

10. The method of claim 9, wherein the normalizing of the weight of each matching algorithm is performed using $$w_i = \frac{W_i}{\sum_{j=1}^{N} W_j},$$

where $w_i$ indicates a normalized weight, $W_i$ indicates a calculated weight and N indicates the number of matching algorithms.

11. The method of claim 7, wherein the performing of the matching algorithms on the query image and the generating of the scores comprises:

configuring R, G and B channel images from the query image;

performing a matching algorithm on the R, G and B channel images and generating R, G and B channel scores;

normalizing the R, G and B channel scores;

estimating a weight of each of the normalized R, G and B channel scores based on an EER and contribution of each of the normalized R, G and B channel images; and fusing the normalized R, G and B channel scores using the weights thereof.

12. The method of claim 11, wherein the EER according to each matching algorithm is used in the estimating of the weights.

13. The method of claim 7, wherein the performing of the matching algorithms on the query image and the generating of the scores comprises:

configuring R, G and B channel images from the query image;

estimating a weight of each of the R, G and B channel images based on an EER and contribution of each of the R, G and B channel images;

fusing the R, G and B channel images using the weights thereof and generating a grayscale image; and performing a matching algorithm on the grayscale image and generating a score of the query image.

14. The method of claim 13, wherein the EER according to each matching algorithm is used in the estimating of the weights.

15. A non-transitory computer-readable recording medium on which a computing device-readable code for executing an object verification method on a computer is recorded, the method comprising:

performing a plurality of different matching algorithms on a query image and generating a plurality of scores;

normalizing each of the generated scores to be adaptive to the quality of the query image by using a different normalization parameter;

estimating weights of the normalized scores based on the respective matching algorithms applied; and fusing the normalized scores by respectively applying the estimated weights to the normalized scores, wherein the estimating of the weights comprises:

calculating an equal error rate (EER) of each matching algorithm in order to evaluate performance of each matching algorithm;

calculating a weight exponent using a mean value of the calculated EERs;

calculating a weight of each matching algorithm using the EER of each matching algorithm and the weight exponent; and normalizing the weight of each matching algorithm, and the calculating of the weight exponent is performed using Ie=a*E(EERm)2+b*E(EERm)+c, E(EERm)=max(3+log EERm, 0), where Ie indicates a weight exponent, EERm indicates a mean value of the respective EERs of the matching algorithms, and a, b, and c indicate constants.

16. An object verification method comprising:
performing, by a processor, a plurality of different matching algorithms on a query image and generating a plurality of scores;
normalizing each of the generated scores to be adaptive to the query image;
estimating weight of the normalized scores based on the respective matching algorithms applied;
normalizing the estimated weights of the normalized scores; and
fusing the normalized scores by respectively applying the normalized weights to the normalized scores,
wherein the estimating of the weights comprises:
calculating an equal error rate (EER) of each matching algorithm in order to evaluate performance of each matching algorithm;
calculating a weight exponent using a mean value of the calculated EERs;
calculating a weight of each matching algorithm using the EER of each matching algorithm and the weight exponent, and
wherein the calculating of the weight exponent is performed using $Ie=a*E(EERm)2+b*E(EER)+c$, $E(EER)=\max(3+\log EERm, 0)$ wherein IE indicates a weight exponent, EERm indicates a mean value of the respective EERs of the matching algorithms, and a, b and c indicate constants.

* * * * *

UNITED STATES PATENT AND TRADEMARK OFFICE
CERTIFICATE OF CORRECTION

PATENT NO. : 8,219,571 B2  
APPLICATION NO. : 11/708558  
DATED : July 10, 2012  
INVENTOR(S) : Haibing Ren et al.

It is certified that error appears in the above-identified patent and that said Letters Patent is hereby corrected as shown below:

In the Claims

In Col. 12, Line(s) 53-54, In Claim 1, delete "0) wherein IE" and insert -- 0), where Ie --, therefor.

In Col. 13, Line 37 (Approx.), In Claim 7, delete "devie" and insert -- device --, therefor.

In Col. 13, Line 53, In Claim 7, delete "b*E(EER)+c, E(EER)" and insert -- b*E(EERm)+c, E(EERm) --, therefor.

In Col. 13, Line 54, In Claim 7, delete "0) wherein IE" and insert -- 0), where le --, therefor.

In Col. 15, Line 10 (Approx.), In Claim 16, delete "weight" and insert -- weights --, therefor.

In Col. 16, Line(s) 8-9 (Approx.), In Claim 16, delete "exponent," and insert -- exponent; --, therefor.

In Col. 16, Line 10 (Approx.), In Claim 16, below "and" insert -- normalizing the weight of each matching algorithm, and --.

In Col. 16, Line 11 (Approx.), In Claim 16, delete "b*E(EER)+c, E(EER)" and insert -- b*E(EERm)+c, E(EERm) --, therefor.

In Col. 16, Line 12 (Approx.), In Claim 16, delete "0) wherein IE" and insert -- 0), where le --, therefor.

Signed and Sealed this  
Twenty-sixth Day of November, 2013

Margaret A. Focarino  
*Commissioner for Patents of the United States Patent and Trademark Office*